(12) United States Patent  (10) Patent No.: US 6,651,541 B2
Faircloth  (45) Date of Patent: Nov. 25, 2003

(54) BAND SAW ATTACHMENT FOR CUTTING ARCUATE PANELS FROM A PIECE OF STOCK

(76) Inventor: Robert A. Faircloth, 5897 Dunn Rd., Roseboro, NC (US) 28382

( * ) Notice: Subject to any disclaimer, the term of this patent is extended or adjusted under 35 U.S.C. 154(b) by 111 days.

(21) Appl. No.: 09/795,545

(22) Filed: Feb. 28, 2001

(65) Prior Publication Data

US 2001/0009120 A1 Jul. 26, 2001

Related U.S. Application Data

(62) Division of application No. 09/237,311, filed on Jan. 26, 1999, now Pat. No. 6,220,132.

(51) Int. Cl.[7] ................................................. B26D 7/06
(52) U.S. Cl. ........................ 83/733; 83/468.8; 83/468.9; 83/468.93
(58) Field of Search ...................... 83/13, 468.3, 468.2, 83/468.8, 468.93, 452, 733, 439, 35, 36, 44, 45, 48, 468.9

(56) References Cited

U.S. PATENT DOCUMENTS

| 2,625,186 | A | * | 1/1953 | Sayers | ........................ 83/439 |
| 3,995,521 | A | * | 12/1976 | Raphael | ..................... 83/410.9 |
| 4,027,566 | A | * | 6/1977 | Harrill | ........................ 83/410.9 |
| 4,047,458 | A | * | 9/1977 | Hall | ........................... 83/439 |
| 4,244,253 | A | * | 1/1981 | Flanigan | ..................... 83/410.9 |
| 4,269,098 | A | * | 5/1981 | Fogle | ........................... 83/733 |
| 4,934,423 | A | * | 6/1990 | Withrow | .................... 144/286.1 |
| 4,974,306 | A | * | 12/1990 | Cole et al. | ..................... 29/434 |
| 5,261,304 | A | * | 11/1993 | Stollenwerk et al. | ....... 83/410.8 |

* cited by examiner

Primary Examiner—M. Rachuba
(74) Attorney, Agent, or Firm—Coats & Bennett, P.L.L.C.

(57) ABSTRACT

A band saw attachment for working in conjunction with a band saw for cutting arcuate panels from a piece of stock. The attachment includes a frame structure and a carriage movably mounted on the frame structure and movable back and forth between selected cutting positions. A rotating support is pivotally mounted to the carriage and pivotally movable back and forth relative to the blade of the band saw. In operation, the rotating support receives and holds a piece of stock and by rotating the support the blade of the band saw functions to cut arcuate shaped panels from the piece of stock.

16 Claims, 5 Drawing Sheets ured for the present drawings, the band saw
BAND SAW ATTACHMENT FOR CUTTING ARCUATE PANELS FROM A PIECE OF STOCK

CROSS REFERENCE TO RELATED APPLICATION

This is a divisional of U.S. patent application Ser. No. 09/237,311 filed Jan. 26, 1999 now U.S. Pat. No. 6,220,132.

FIELD OF THE INVENTION

The present invention relates to band saws and more particularly to a band saw attachment for cutting curved or arcuate shaped panels from a piece of stock.

BACKGROUND OF THE INVENTION

Various types of unusual and ornate wood assemblies include curved or arcuate shaped strips or panels. For example, circular shutter assemblies include an overhead arch frame that normally includes a series of arcuate or curved shaped panels. Further, it has become popular in recent years to provide archways over windows and doors, and the overhead structure that form these assemblies typically includes one or more arched panels, including finish trim.

These types of arched or curved assemblies that include the arcuate or curved shaped strips or panels are in high demand among residential builders, architects and interior designers because of the aesthetic qualities that they add. However, arcuate shaped wood assemblies are difficult to make with consistent and repeated accuracy and are especially difficult to manufacture economically on a production scale. In fact, these arcuate shapes, strips or panels are typically made by skilled wood craftsmen and because of that, they are generally expensive and limited. Because of the precision and skill that is required, it is very difficult to make these arcuate or curved shaped panels unless the person doing the work is highly skilled.

Thus, there is and has been a need for a machine and process for making precision cut arcuate shaped panels in such a fashion that they are precise and affordable.

SUMMARY OF THE INVENTION

In view of the above, the present invention entails a band saw attachment that works in conjunction with a band saw to produce arcuate or curved shaped strips or panels. The band saw attachment of the present invention comprises a frame structure designed to be stationed adjacent a conventional band saw. Moveably mounted on the frame structure is a carriage that moves back and forth between different cutting positions. Rotateably mounted to the carriage is a rotating support. The rotating support receives and holds a piece of stock, such as a piece of plywood, wood panel or a wood composite. The rotating support is connected to the carriage and can be swung from side to side with respect to the carriage. By securing the stock to the rotating support, it is seen that the operator can rotate the stock through the band saw blade and in that process an arcuate cut is formed in the stock. By selectively positioning the carriage and the stock with respect to the rotating support, it follows that one or more arcuate or curved panels can be cut from the stock.

Turning briefly to the process or method of the present invention, the stock is secured to the rotating support that is attached to the carriage disposed adjacent the band saw. First the carriage is positioned at a first cutting position. Next, the rotating support is rotated relative to the carriage and the stock is moved into cutting engagement with the band saw blade. The rotating support is continued to be rotated causing the band saw blade to cut a first arcuate cut through the stock. After this, the carriage is advanced towards the blade of the band saw a selected distance. Then the carriage is set or anchored with respect to the frame structure. Now the rotating support is once again rotated such that the stock is rotated through the band saw blade and during this rotation, the band saw blade acts to perform a second arcuate cut through the stock. Once this cut is finalized, the two cuts effectively form or yield a strip of an arcuate shaped panel.

An object of the present invention is to provide an attachment that is compatible with a conventional band saw that will cooperate with the band saw to produce arcuate or curved shaped panels.

Still a further option of the present invention resides in the provision of an attachment for a band saw that will enable such arcuate shaped panels to be cut accurately, and that by adjusting the travel of the carriage between particular cutting operations, the height or radii of the respective arcuate shaped panels can be adjusted.

Other objects and advantages of the present invention will become apparent and obvious from a study of the following description and the accompanying drawings which are merely illustrative of such invention.

DETAILED DESCRIPTION OF THE INVENTION

Figure 1:
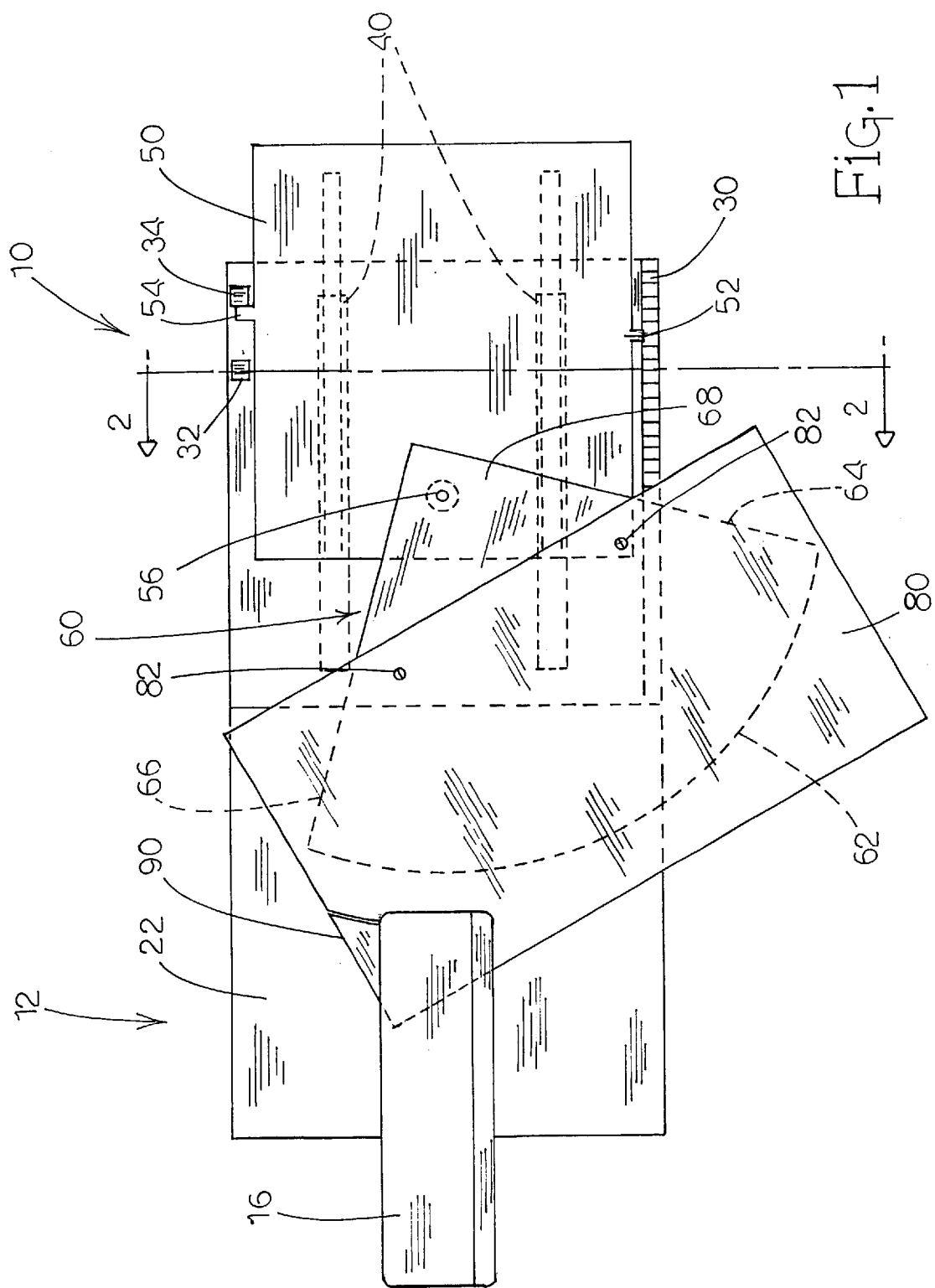
FIG. 1 is a top plan view of the band saw attachment of the present invention mounted adjacent a conventional band saw.
Figure 2:
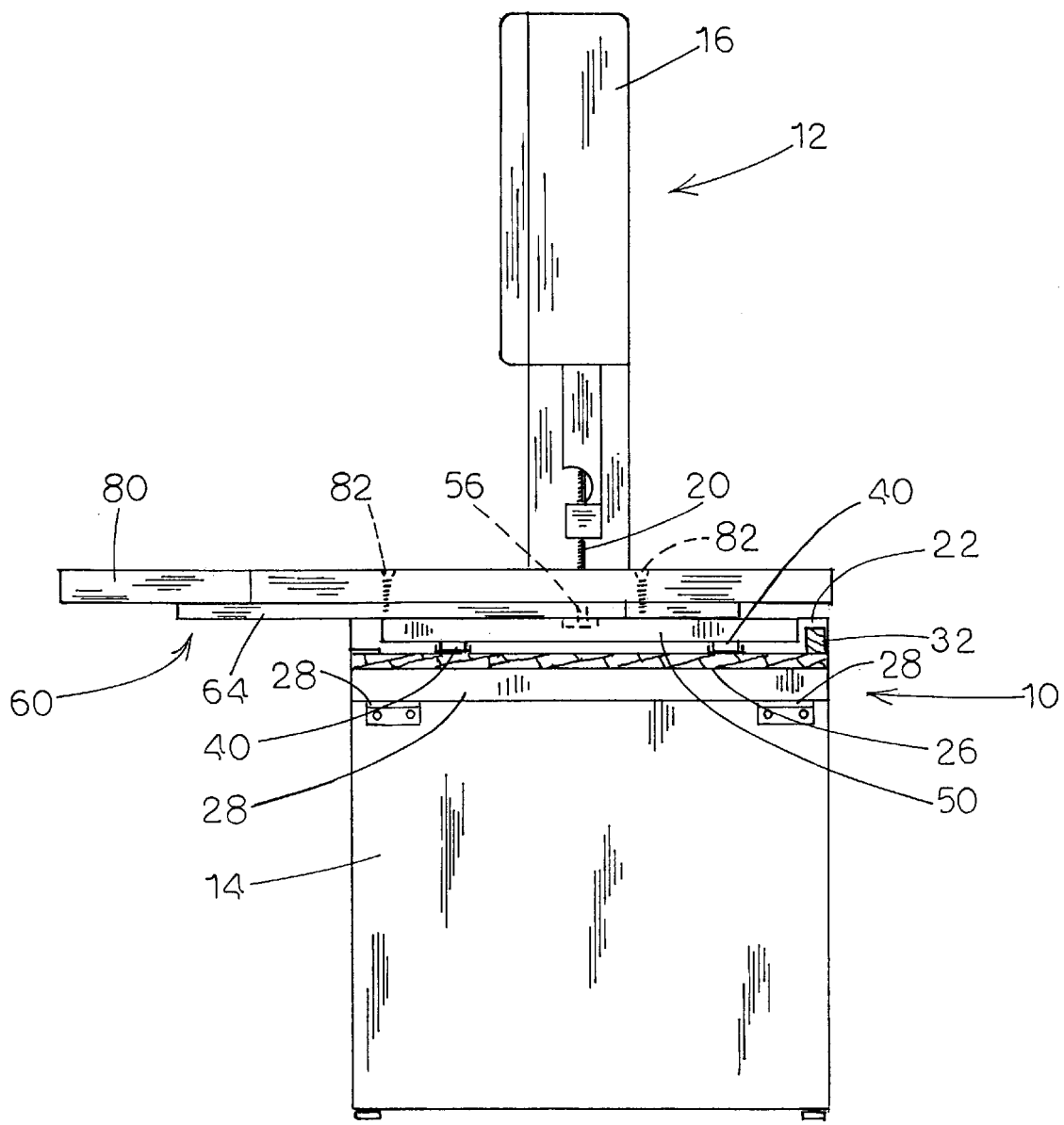
FIG. 2 is a sectional view taken through the line 2—2 of FIG. 1.

With further reference to the drawings, the band saw attachment of the present invention is indicated generally by the numeral 10. As discussed above, band saw attachment 10 is designed to cooperate and work with a conventional band saw that is shown in the drawings and indicated generally by the numeral 12. Before discussing the band saw attachment 10 in more detail it may be beneficial to briefly set forth the basic structure of the conventional band saw 12. In this regard, band saw 12 includes a base housing 14 and an overhead housing 16. Disposed generally between the base housing 14 and overhead housing 16 is a table 22. Disposed over the table is a blade guide assembly indicated generally by the numeral 18, the blade guide assembly depending downwardly and supported by the overhead housing 16. A band saw blade 20 is threaded through the blade guide assembly 18 and basically extends around the base housing 14 and the overhead housing 16. An opening (not shown) is formed in the table 22 that permits the blade 20 to pass therethrough as it moves through the base housing 14 and the overhead housing 16.

Details of the band saw 12 are not dealt with herein in detail because such is not per se material to the present invention, and further, band saws of the type disclosed herein are widely known and appreciated by those people skilled in the art.

Figure 3:
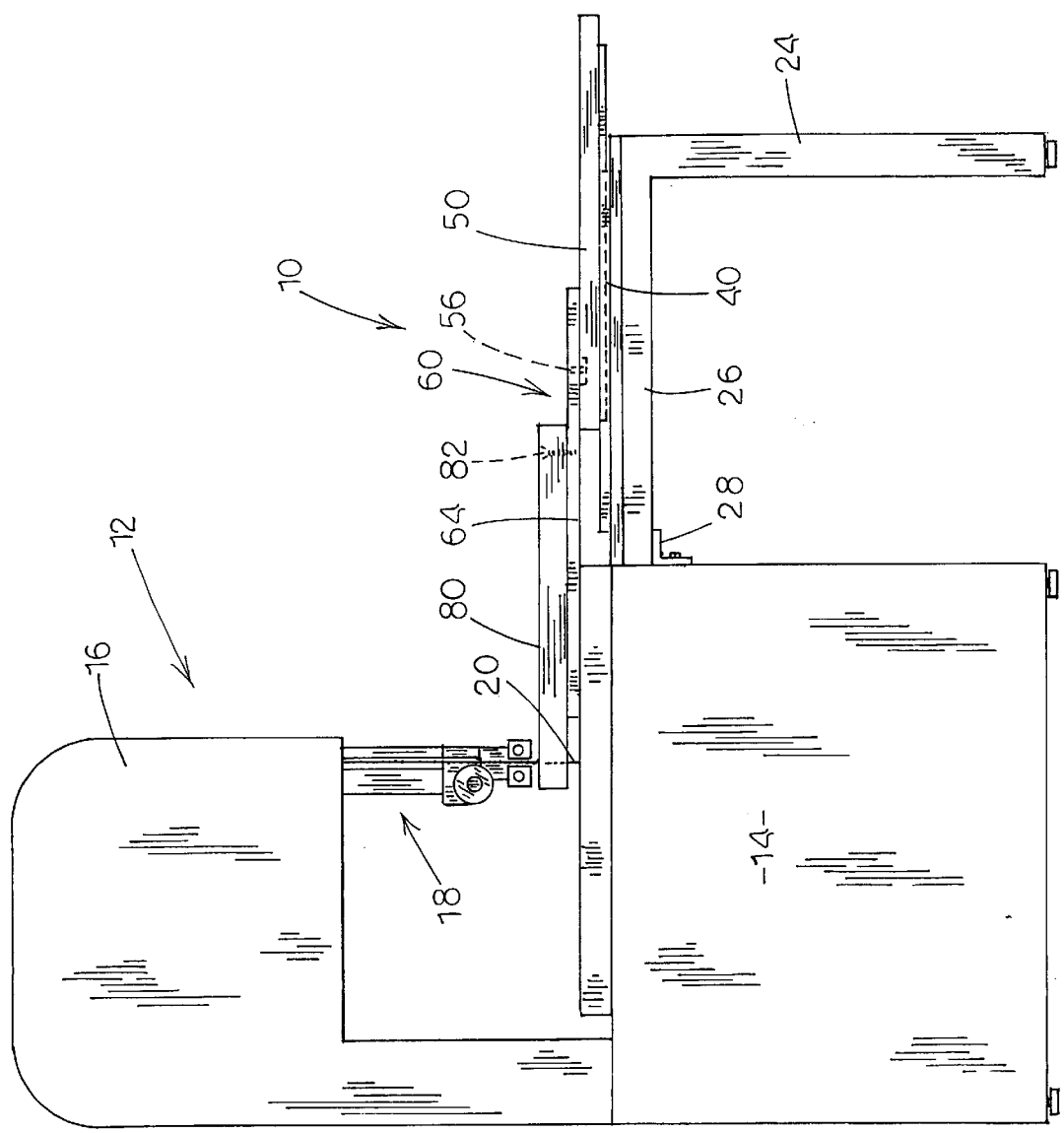
FIG. 3 is a side elevational view of the band saw attachment and band saw.

Turning to the band saw attachment 10, it is first pointed out that this attachment is particularly designed to work in conjunction with the conventional band saw 12. More particularly, the band saw attachment 10 includes a frame structure that is adapted to be disposed directly adjacent the band saw 12 and in a preferred embodiment it is contemplated that the frame structure would be secured directly to a selected portion of the band saw 12. In the embodiment disclosed herein, the frame structure includes a leg structure 24 and a horizontal support structure 26. The horizontal support structure 26 extends from one side of the band saw 12 outwardly therefrom to the support leg 24. As illustrated in FIG. 3, the horizontal support structure 26 can be provided with a mounting bracket 28 that enables the entire frame structure to be bolted to a side portion of the band saw 12.

Along one side edge of the horizontal support structure 26 there is provided a measuring tape segment 30. On the opposite of the horizontal support 26 there is provided a pair of spaced apart adjustable stops 32 and 34. The significance of the measuring tape segment 30 and the stops 32 and 34 will become apparent from subsequent portions of this disclosure.

Mounted to the frame structure is a pair of slide assemblies, each being indicated by the numeral 40. The slide assemblies envisioned here can be of the type that is typically used to support sliding drawers in a cabinet or desk structure, in particular, full extension type of drawer slide units or equivalent.

The slide assemblies 40 are secured about the upper portion of the horizontal support structure 26. However, each slide assemble includes an upper portion that is slideable back and forth with respect to the portion of the slide assembly that is mounted directly to the horizontal support structure 26. The upper or slideable portions of the slide assemblies 40 are connected to a carriage that is indicated by the numeral 50. Carriage 50 is directly coupled to the slide assemblies 40 such that the carriage 50 may move left to right and right to left as viewed in FIG. 1. It is appreciated that other types of attaching means could be incorporated between the frame structure and the carriage 50. For example, the frame structure or the horizontal support structure 26 could be provided with spaced apart support rails for supporting a series of wheels that are in turn secured directly or indirectly to the underside of the carriage 50. In any event, the point being made is that there are other ways to support the carriage 50 such that it can move back and forth on the frame structure.

Viewing the carriage 50 more particularly, it is seen that along one side there is provided a pointer 52. Pointer 52 projects from one side or one edge of the carriage 50 towards the measuring tape segment 30. Tape segment 30 shall be affixed in a parallel position to the travel of carriage 50. On the opposite side of the carriage 50, is a stop engager 54. The stop engager projects outwardly from the opposite side of the carriage 50 to where it generally lies between the two adjustable stops 32 and 34. Thus in one mode of operation, the back and forth movement of the carriage 50 can be limited by the stops 32 and 34.

Secured to the carriage 50 about a forward portion thereof is a rotating support indicated generally by the numeral 60. In fact, in the embodiment contemplated, the rotating support 60 is pivotally connected to the carriage 50 such that the rotating support can swing or rotate from side to side about the carriage 50. Viewing the rotating support 60 in more detail, it is seen that the same is supported about a corner area 68 by the carriage 50. From the carriage 50, the rotating support projects over a portion of the frame structure of the band saw attachment 10 and rests on the table 22 that forms a part of the band saw 12. As will become appreciated from subsequent portions of this disclosure, the rotating support 60 engages the table 22 and slides from side to side thereon during the cutting operation, to be described later.

Viewing the rotating support 60 in more detail, it is seen that the same includes a forward curved edge 62. Extending from the extremes of the curved edge 62 is a pair of edges 64 and 66 that extend rearwardly to the corner area 68. Formed in the corner area 68 is an opening for receiving a pivot pin 56 that extends upwardly through an opening within the carriage 50. The pivot pin 56 extends through the rotating support 60 in the corner area 68. Thus the rotating support 60 generally rotates about the axis of the pivot pin 56.

In a cutting operation, a piece of stock 80 is secured to the upper surface of the rotating support 60 by one or more fasteners 82. Typically, the fasteners are wood screws that extend downwardly through the stock 80 and penetrate the rotating support 60.

Figure 4:
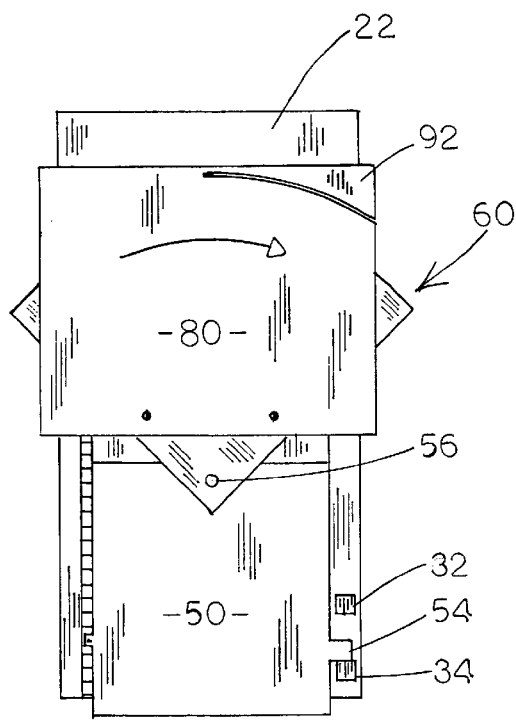
FIGS. 4–10 are a sequence of plan views that illustrate the method of the present invention for cutting arcuate or curved shaped panels.
Figure 5:
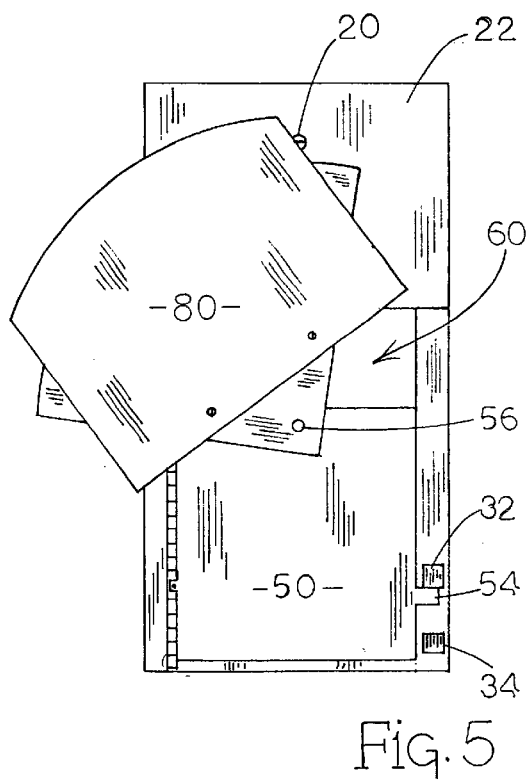

The band saw attachment 10 is designed to cooperate with the band saw 12 to cut arcuate strips or panels from the stock 80. Although the attachment 10 may have other utility, it is contemplated that its primary utility would be in the area of cutting these arcuate or curved shaped strips or panels from a piece of wood stock. Turning to FIGS. 4–10, the basic method of the present invention is illustrated therein. Beginning with FIG. 4, the carriage 50 is disposed in a first cutting position, with pointer 52 indicating over tape segment 30 the desired radius for the first cut. This indicated measurement by pointer 52 over tape segment 30 will correspond to a measurement taken from the right side or working side of the band saw blade 20 and the center of the pivot pin 56. Furthermore, in attaching band saw assembly 10 to band saw 12, the tape segment should be calibrated, or set in position such that in whatever position carriage 50 is set, the distance from the right or working side of band saw blade 20 to the center of pivot pin 56 always agrees with the measurement indicated by pointer 52 over the tape segment 30. With pointer 52 indicating the desired radius for the first cut, the carriage 50 is clamped or otherwise secured in a locked position for the duration of the first cut. Note that the stop engager 54 is pushed back to where it engages the outer most or rearward stop 34. The illustration in FIG. 4 shows the band saw blade cutting a trim strip 90 from the piece of stock 80. Note that the rotating support 60 is disposed in a general central position in FIG. 4 but that a partial cut has already been made. In fact, the rotating support 60 along with the stock 80 are being rotated clockwise as viewed in FIG. 4. As the rotating support 60 is rotated clockwise, the band saw blade trims an upper portion from the stock 80. This upper portion is the trim, waste or scrap 90. In the process of making this cut, the band saw blade is said to be making a first arcuate cut and this can sometimes be referred to as a trim cut or first cut. The cut edge being formed on the stock 80 will become the upper or outer edge or outside radius of the arcuate panel that will eventually be produced by this process. The radius of this cut is constant throughout the cut and agrees with the measurement of pointer 52.

Figure 6:
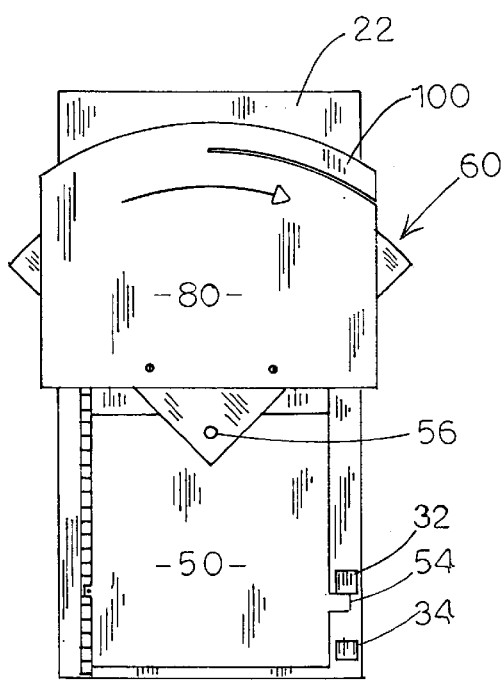

After the rotating support 60 has assumed its extreme counter-clockwise position, then the trim scrap 90 will have been removed from the stock 80. Before making the second cut, the carriage 50 is advanced to its second cutting position and locked into the secured cutting position, with pointer 52 again indicating on tape segment 30 the desired radius for the second cut. Here the stop engager 54 engages the inner or forward stop 32 on the main frame structure. Note in FIG. 5 where the rotating support 60 has been rotated back counter-clockwise to its extreme counter-clockwise position. Note that the band saw blade has been moved down one side of the stock but is still disposed forwardly of the curved outer edge 62 of the rotating support 60. Turning to FIG. 6, it is seen that the rotating support 60 along with the stock 80 is again rotated clockwise. In doing so, the band saw makes a second arcuate cut and this arcuate cut forms the lower edge or inside radius of the arcuate panel 100 that is being cut. As the rotating support 60 is rotated to its full clockwise position it is seen that the band saw blade will be passed complete through the stock 80 and the arcuate or curved shaped panel 100 will be produced. It should be pointed out at this time that once the carriage 50 has assumed one of its cutting positions, that it is effectively locked in place with respect to the main frame and the band saw 10. This can be achieved by a number of ways. In one embodiment it is contemplated that the operator would simply clamp the carriage 50 to a part of the main frame structure. There are other ways, even automatic ways, of achieving this.

Figure 7:
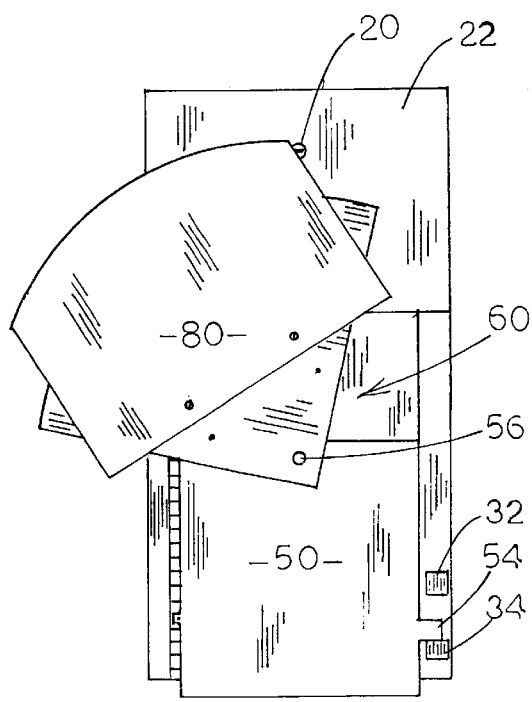
Figure 8:
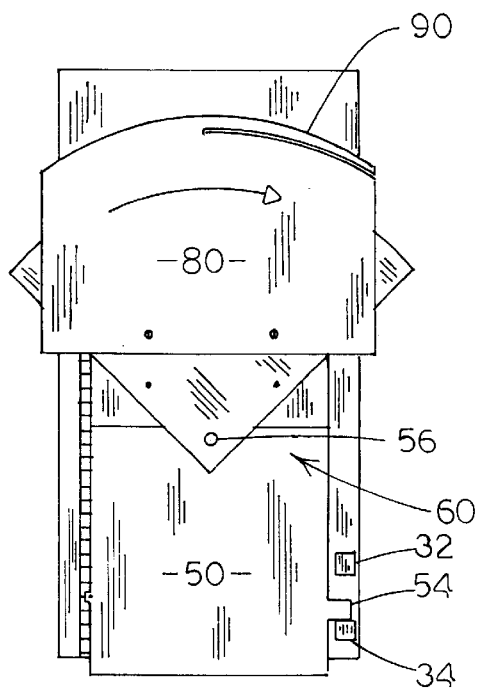
Figure 9:
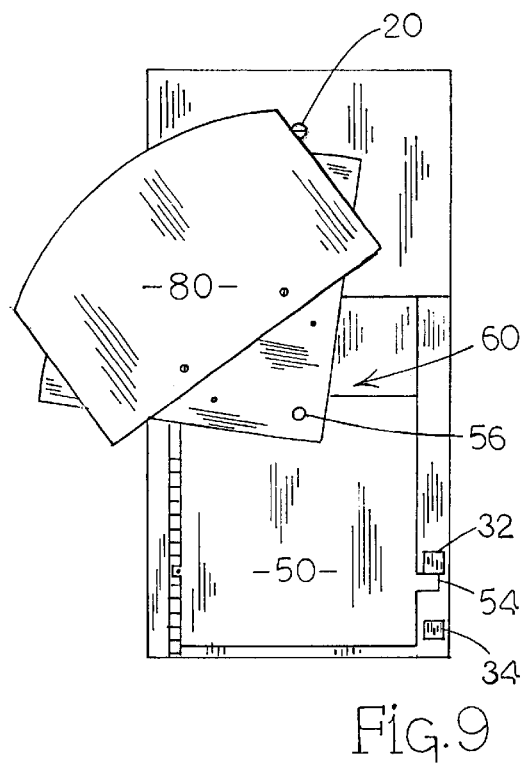

After the second cut shown in FIG. 6 has been completed, then additional arcuate panels 100 can be cut from the same stock 80. But in order to do this, the stock 80 has to be advanced toward the band saw blade 20 on the rotating support 60. Thus in this case, the original wood screws 82 are removed and the piece of stock 80 is advanced on the rotating support 60 towards the band saw blade. As shown in FIG. 7, the stock 80 should be positioned on the rotating support 60 such that a trim strip 90 can be cut from the stock 80 to form the upper edge or outside radius of the arcuate panel 100. Thus note in FIG. 7 where the stock 80 has been particularly positioned on the rotating support 60 such that the stock 80 can be trimmed. See FIG. 8 where this trim step is being carried out. Again the rotating support 60 is being rotated clockwise and the band saw blade 20 is making a first arcuate cut in the stock 80 so as to produce another trim or waste strip 90. Once the trim strip 90 has been cut from the stock 80 as shown in FIG. 8, then the carriage 50 is unclamped or unsecured with respect to the main frame and advanced to a second cutting position where the stop engager 54 engages the inner stop (FIG. 9) 32. Also, it is noted in FIG. 9 where the rotating support 60 has been rotated back to its extreme counter clockwise position.

Figure 10:
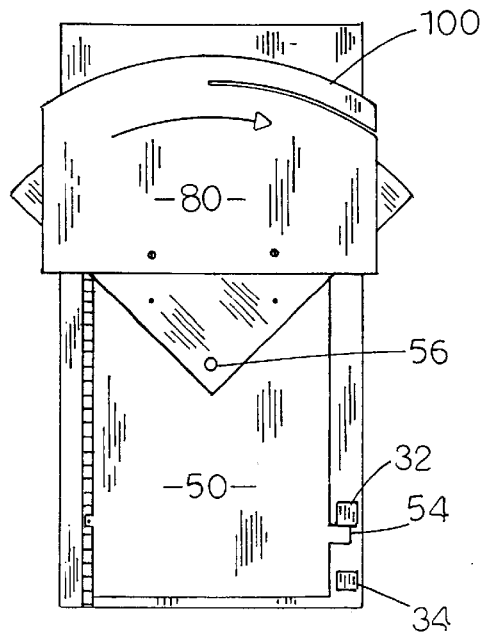

To cut the second arcuate shaped panel 100, the position of the carriage 50 is fixed with respect to the main frame and the rotating support 60 is rotated clockwise as shown in FIG. 10. This produces the second arcuate or curved shaped panel 100.

As noted above, the stops 32 and 34 can be adjustably mounted on the main frame. For example, each stop may include a threaded bolt that extends downwardly through an elongated slot. A wing nut can be threaded on the bolt so as to station the stop on the main frame. By selectively moving the stop in the slot, one can adjust the position of one stop with respect to the other. This allows an operator to vary the height, radii, or width, depending on the nomenclature of the arcuate panel 100. In addition, the operator can use the pointer 52 and a segment of measuring tape 30 to cut arcuate shaped panels of various height or radii.

From the foregoing specification and discussion, it is appreciated that the present invention entails an apparatus and a method for cutting arcuate or curved shaped panels accurately, repetitiously, time after time, and in a more economically productive manner as opposed to free hand cutting. As pointed out above, the band saw attachment 10 enables the operator to adjust the various cuts to provide desirable variances in the panels being cut.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A band saw attachment for working in conjunction with a band saw for cutting arcuate panels from a piece of stock having upper and lower sides, the band saw attachment comprising:
   a. a frame structure adapted to be mounted adjacent the band saw;
   b. carriage means mounted on the frame structure for moving back and forth relative to the band saw;
   c. support means having an upper surface for receiving the lower side of the stock and supporting the stock such that the stock lies on the upper surface of the support means;
   d. the support means being pivotally mounted to the carriage means;
   e. means for securing the stock to the upper surface of the support means such that the stock lies on the upper surface of the support means and moves with the support means as the support means is rotated on the carriage means;
   f. a first stop for engaging the carriage means and stationing the carriage means from movement in at least one direction as the support means is rotated and the band saw cuts an arc through the stock; and
   g. a second stop spaced from the first stop for engaging the carriage means and stationing the carriage means from movement in at least one direction as the support means is rotated and the band saw cuts an arc through the stock.

2. The band saw attachment of claim 1 wherein the support means includes a curve shaped outer edge that turns past a blade that forms a part of the band saw during the cutting operation.

3. The band saw attachment of claim 2 wherein the support means includes two opposite side edges that extend from a common corner to the curved shaped outer edge and wherein the support means includes a corner portion where the support means is pivotally connected to the carriage at the corner portion.

4. The band saw attachment of claim 1 wherein said first and second stops are spaced apart and aligned, and wherein the carriage means includes a stop engager that projects between the two spaced apart stops and moves back and forth there between as the carriage means is moved between respective cutting positions.

5. The band saw attachment of claim 1 wherein at least one of the two stop means is adjustable such that a distance between the cutting positions of the carriage means can be adjusted.

6. The band saw attachment of claim 4 wherein one of the stops is adjustable with respected to the other stop such that the distance between the cutting positions of the carriage means can be adjusted.

7. The band saw attachment of claim 1 including a measuring segment disposed adjacent the carriage means with distances being incrementally depicted thereon, and wherein there is provided a pointer secured to the carriage means and which extends therefrom for pointing to the increments found on the measuring segment.

8. The band saw attachment of claim 1 wherein the support means includes a flat panel pivotally mounted to the carriage means and including an upper flat surface for receiving and supporting the stock, and wherein the means for securing the stock secures the stock to the upper surface of the flat panel.

9. The band saw attachment of claim 8 wherein the flat panel includes two edges that form a corner and an arcuate shaped edge that extends between the two edges.

10. The band saw attachment of claim 9 wherein the flat panel is pivotally connected to the carriage means at the corner formed by the two edges of the flat panel.

11. The band saw attachment of claim 1 wherein the securing means for securing the stock to the upper surface of the support means includes means for securing the stock at two different and distinct positions on the upper surface of the support means.

12. The band saw attachment of claim 9 wherein the arcuate shaped edge of the flat panel is generally disposed between the carriage means and the blade of the band saw.

13. The band saw attachment of claim 8 wherein the band saw includes a table and wherein when the frame structure of the band saw attachment is mounted adjacent the band saw, the flat panel projects onto and lies on the table of the band saw.

14. The band saw attachment of claim 1 wherein the support means assumes a generally pie shaped configuration and includes a corner area, and wherein there is provided a pivot pin that is operatively attached to the corner area of the support means for pivotally mounting the support means to the carriage means.

15. The band saw attachment of claim 1 wherein the carriage means includes a pair of spaced apart slide assemblies and a carriage mounted to the spaced apart slide assemblies and movable back and forth thereon.

16. The band saw attachment of claim 15 wherein the carriage includes a generally flat carriage panel that extends over the two spaced apart slide assemblies.

\* \* \* \* \*